April 12, 1927.
G. A. FOISY
HEAT INTERCHANGE APPARATUS
Filed Feb. 13, 1926
1,624,487
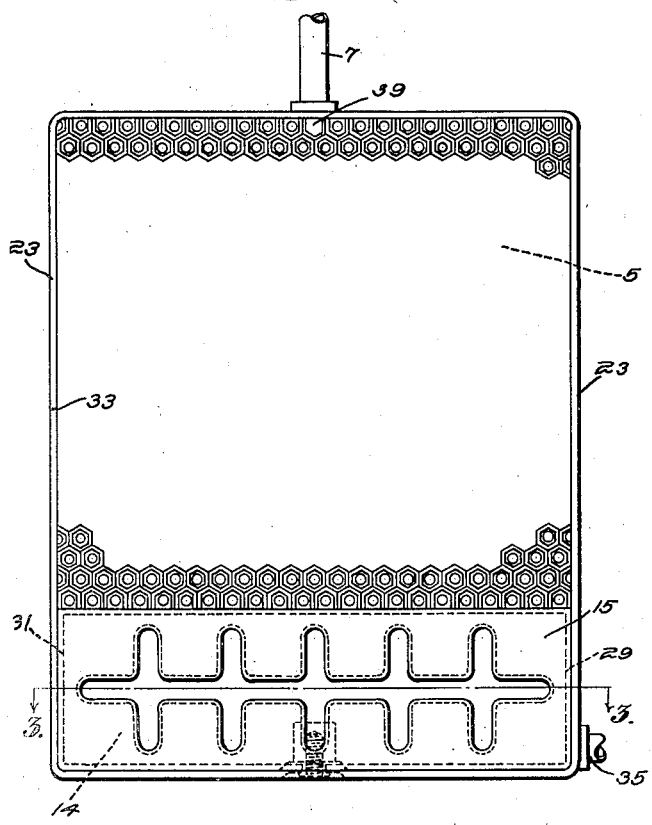
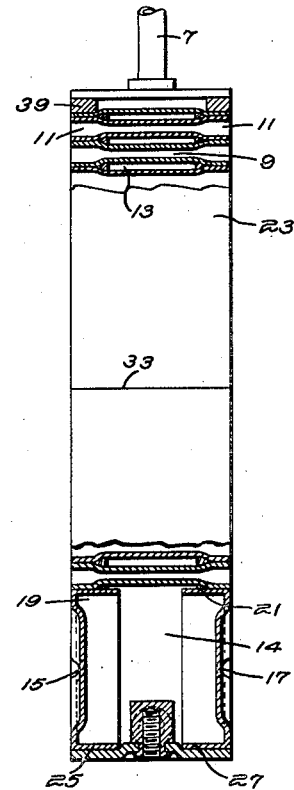
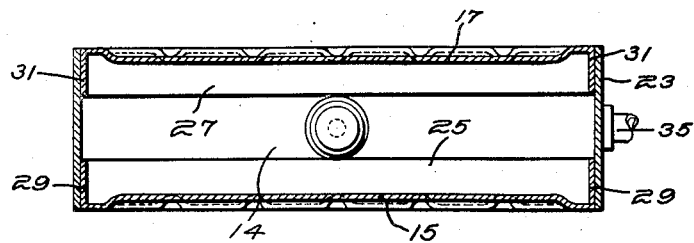
Inventor:
George A. Foisy,
by Emery Booth Janney Varney
Attys.

Patented Apr. 12, 1927.

1,624,487

UNITED STATES PATENT OFFICE.

GEORGE A. FOISY, OF LOWELL, MASSACHUSETTS, ASSIGNOR, BY MESNE ASSIGNMENTS, TO WINCHESTER REPEATING ARMS COMPANY, OF NEW HAVEN, CONNECTICUT, A CORPORATION OF CONNECTICUT.

HEAT-INTERCHANGE APPARATUS.

Application filed February 13, 1926. Serial No. 88,132.

This invention relates to heat interchange apparatus of the type commonly comprising a fluid containing chamber separated from a second fluid containing chamber by a series of relatively thin contacting walls such as may be afforded by a cellular or tubular structure, with the opposite sides of which walls another fluid is caused to contact and effect a heat interchange with the fluid in contact with the opposite sides thereof.

Such a structure, by way of example, may consist of a tubular core forming a chamber traversed by a multiplicity of metallic tubes having thin walls through which tubes air or other fluid is passed, the opposite ends of the tubes being enlarged and so shaped as to permit of their assemblage as a unit with their ends fitting closely together, and the intermediate portions of the tubes being separated each from the other, the contacting faces of the ends being united by suitable bonding metal to form tight joints and to provide closed front and rear walls for the chamber, the latter also being encased inside the end walls to form a closed compartment through which fluid either in gaseous or liquid form may be passed through suitable inlet and outlet openings.

One object of the present invention is to adapt such structure to effective use as a condenser for refrigeration or other like purposes, and to provide also a liquid receiving chamber united in the same integral structure with the condensing chamber.

The invention will be best understood by reference to the following description when taken in connection with the accompanying illustration of one specific embodiment thereof, while its scope will be more particularly pointed out in the appended claims.

In the drawings,—

Fig. 1 is a front elevation showing a condenser embodying one form of the invention;

Fig. 2 is a side elevation thereof in partial section; and

Fig. 3 is a sectional plan of the same condenser shown in Fig. 1 and taken on the line 3—3 in the latter figure.

Referring to the drawings and to the illustrated embodiment of the invention there shown, the condenser comprises a condensing chamber 5 traversed by a multiplicity of tubular conduits. The vapor to be condensed enters the chamber through the inlet pipe 7 as, for example, from the compressor of a refrigerating machine, cooling air being circulated through the interior of the tubes, such cooling air being caused to enter the tubes from one side of the structure and to pass out at the opposite side.

The body of the condenser is prepared by assembling in the form of a core of any suitable shape, but herein of rectangular outline, a group of tubes 9 preferably thin walled and preferably formed of copper, brass or other suitable material. The main body of each tube is of circular cross section but at opposite ends it is enlarged into a non-circular, polygonal and herein hexagonally shaped head 11, the heads when grouped or assembled being in close fitting or contacting relation, while the intermediate portions of circular cross section are separated by narrow spaces 13 which communicate with each other throughout the entire core to form the condensing chamber 5.

To form the liquid receiving chamber 14, there are assembled with these tubes imperforate front and rear walls of suitable size and shape to afford the required capacity and geometrical form. These walls may be embodied in a single member if desired, but herein they comprise separate front and rear plates 15 and 17, rectangular in section, and having inwardly turned flanged edges. The upper inturned edges 19 and 21 of the two plates, which edges are of about the same width as the length of the enlarged ends of the tubes, are brought into close contacting relation to the enlarged ends of the bottom row of tubes (as shown in Figs. 1 and 2), the tube heads thereat being so shaped in cross section as to provide a continuous wall of contact between the tubes and the edges of the plates.

The plates and tubes assembled in this fashion and maintained in close fitting relation are placed within a continuous metal band 23 which extends entirely around the parts and has the shape which it is desired to impart to the structure. In the illustrated form of the invention the completed structure is rectangular in outline, but it may be of any desired shape.

The band 23 is preferably of a width coextensive at least with the length of the tubes so that when finished it may act as the permanent side walls of the condenser. At the bottom side of the condenser it overlies and contacts with the bottom inturned edges 25 and 27 of the plates 15 and 17 and at the lateral sides with the inturned edges 29 and 31. At the lateral sides and top side it overlies and contacts with the enlarged ends of the tubes, which ends are so shaped in cross section as to provide a continuous wall of contact.

The band 23 which thus extends around and unites the tubes and plates into an integral structure has its ends butt welded or brazed at 33, or otherwise secured, so as to impart the desired strength to the structure.

The condenser thus formed consisting merely of the continuous band 23 and the contained groups of tubes and imperforate plates 15 and 17, is then completed by the single step of subjecting opposite faces of the structure in succession to the action of a bonding alloy. The opposite faces of the core are first dipped in a bath of soldering flux, as, for example, one containing a zinc chloride base, the latter being allowed to penetrate to a suitable depth, preferably somewhat greater than that represented by the length of the enlarged ends of the tubes. Both opposite faces of the structure are then immersed slightly in a bath of melted solder, which may be formed of any suitable bonding alloy. In the soldering process, however, the entire container is thus dipped so that the contacting edges of the tubes are not only bonded and united to form fluid tight joints, but the band is united at its edges to the tubes and the inturned edges of the plates are bonded to the tubes and to the band, forming thereby fluid tight joints at all points on both front and rear.

The band 23 is provided with suitably arranged openings to receive the inlet pipe 7 and the outlet pipe 35, through which latter the accumulations of condensed vapor may be discharged. The plates 15 and 17 may be made relatively thin and may be corrugated if desired as at 37 to increase the strength of the structure. Since the tensile strength of the band 23 is availed of not only to bind the separate parts together, but also to bind the side walls to the remainder of the structure, its resistance to internal pressure is materially increased. The liquid receiving chamber, being below the level of the tubes, is adapted to maintain an accumulation of condensed liquid therein out of contact with the tubes and without impairing the efficiency of the latter.

It may be desired to leave a space immediately in front of the inlet orifice 7 unobstructed by cross tubes and for this purpose one or more blind tubes 39 or tubular members having closed inner ends, filled if desired with solder, may be employed to form such space.

In connection with the use of the described structure as a condenser for refrigeration purposes, it is a well known fact that the gases within the system of any known type of a mechanical refrigeration are under considerable pressure over that of the atmosphere, these pressures depending upon the expansive forces of the gases used as refrigerating media. One purpose of the band 23 therefore is to bind the metallic tubes together in such a mechanical form that at pressures considerably over those encountered within the systems of a mechanical refrigerator, the tubes will not separate from one another and cause leakage. The use of this band, furthermore, not only provides a construction easily adaptable to quantity production methods, but, in combination with the tubular members, provides a core in which there is presented to the entering gas a multiplicity of paths so that a practical condenser or heat interchange apparatus may be constructed without the necessity of using an inlet tank or distributor.

While I have herein shown and described for purposes of illustration one specific embodiment of the invention, it is to be understood that the same may be varied within wide limits and that extensive deviations may be made therefrom and other applications be made thereof, without departing from the spirit of the invention.

What I claim and desire to secure by Letters Patent is:

A condenser having a condensing chamber formed by a plurality of thin walled tubular members with enlarged closely fitting hexagonal ends bonded together to form front and rear walls and having a liquid receiving chamber below the condensing chamber formed by front and rear plates with inturned flanged edges, the upper flanged edges of the plates being bonded to the enlarged ends of the lowermost tubular members, said plates being corrugated to increase their strength, a continuous band extending around the condenser binding said tubular members and plates together and forming the side walls of the condenser, said band being bonded at its edges to the enlarged ends of the tubular conduits and to the end and bottom flanged edges of said plates thereof to avail of the tensile strength of the band in preventing rupture of the bonded joints under the effect of fluid pressure within the condenser, and inlet and outlet orifices in said band opening into said condenser and said liquid receiving chamber respectively.

In testimony whereof, I have signed my name to this specification.

GEORGE A. FOISY.